F. BIRCHLAND & G. BIRCH.
DEVICE OR MECHANISM FOR DRILLING SQUARE OR IRREGULAR HOLES.
APPLICATION FILED DEC. 4, 1912.
1,113,949.
Patented Oct. 20, 1914.
2 SHEETS—SHEET 1.
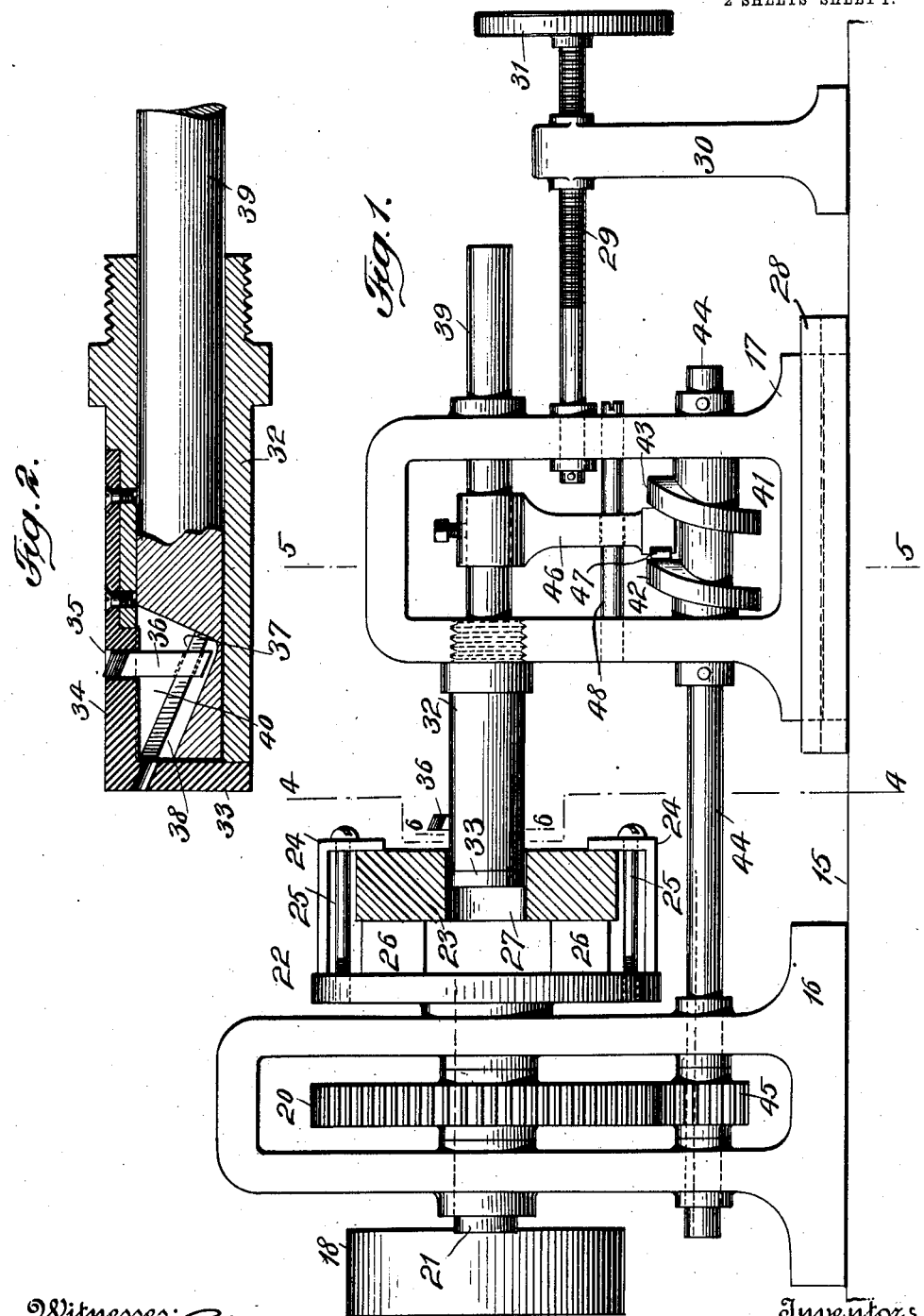

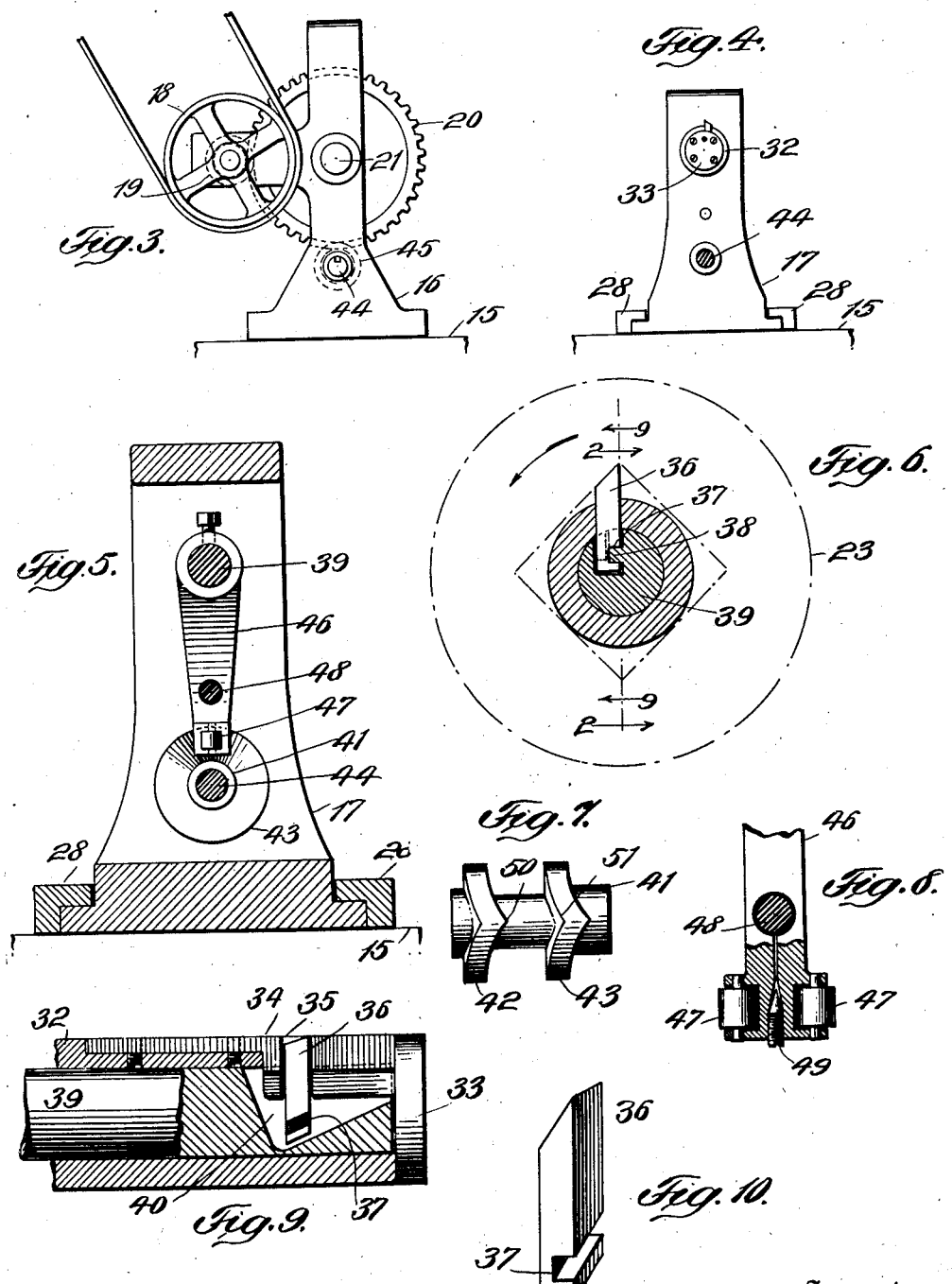

UNITED STATES PATENT OFFICE.

FREDRIK BIRCHLAND AND GUSTAF BIRCH, OF BROOKLYN, NEW YORK.

DEVICE OR MECHANISM FOR DRILLING SQUARE OR IRREGULAR HOLES.

1,113,949.  Specification of Letters Patent.  Patented Oct. 20, 1914.

Application filed December 4, 1912. Serial No. 734,894.

*To all whom it may concern:*

Be it known that we, FREDRIK BIRCHLAND and GUSTAF BIRCH, citizens of the United States, and residents of Brooklyn, in the county of Kings and State of New York, have invented certain new and useful Improvements in Devices or Mechanisms for Drilling Square or Irregular Holes, of which the following is a specification.

The invention relates to novel mechanisms by means of which it is entirely practicable to bore or form square or other holes of polygonal or non-circular outline with accuracy and under conditions rendering the mechanism of commercial utility, and said invention consists in novel features and structures hereinafter described and particularly pointed out in the claims.

The object of the invention is to provide suitable means whereby a round hole drilled in a piece of metal or other material may be additionally bored in lateral directions to transform it into a polygonal or non-circular hole of predetermined character, our invention being equally applicable to the formation of holes having any predetermined number of angles, as, for illustration, holes having four, five, six, eight or more equal sides.

In the preferred embodiment of our invention when used in connection with a lathe, the work or piece of metal having a round hole therein and which hole is to be transformed into a square or other polygonal hole, will be held by a suitable holder or chuck and rotated by the usual spindle-drive, and we will equip the lathe with special mechanism embracing our invention and comprising a tool-holder mounted in a reciprocatory carriage and adapted to enter the round hole in the work, a laterally movable cutting-tool in the forward end of said holder arranged to be projected through the side of the holder against the walls of the hole in the work and returned within the holder at predetermined intervals during each rotation of the work, a reciprocatory slide entering said tool holder and which controls the projection and withdrawal of the cutting-tool with relation to the tool-holder, rotary cam-mechanism for positively and at predetermined intervals moving said slide to control the said projection and withdrawal of the cutting-tool, and a pinion wheel on the shaft of said cam-mechanism and which is driven by the driving gear wheel of the lathe, said driving gear wheel being thus enabled to rotate the work under treatment and also said cam-mechanism which controls, through said slide, the action of the cutting-tool. The cam-mechanism during each rotation moves the aforesaid slide forwardly to project the cutting-tool for a limited period to cut an angle in the wall of the hole in the work and then rearwardly to secure the withdrawal of said tool from said wall. Since the cutting-tool is projected only once during each rotation of the cam-shaft, we time the rotation of said shaft with relation to the rotation of the work or piece of metal under treatment so that said shaft shall during each rotation of the work have as many rotations as there are angles to be formed in the hole in the work, as, for instance, if the hole is to be square the cam-shaft will be given four rotations during one rotation of the work, and if the hole in the work is to be five-sided the cam-shaft will be given five rotations during one rotation of the work. The timing of the rotation of the cam-shaft with relation to the rotation of the work may be conveniently accomplished by employing a suitable pinion-wheel on the cam-shaft to engage the main driving gear of the lathe, the said gear wheel being four to one, or five to one, for illustration, with relation to the pinion wheel.

The invention will be fully understood from the detailed description hereinafter presented, reference being had to the accompanying drawings, in which:

Figure 1 is a side elevation of a portion of a lathe equipped with mechanism embodying our invention, the work or piece of metal held by the lathe and to have a polygonal hole formed therein being illustrated in section; Fig. 2 is an enlarged vertical longitudinal section, partly broken away, through the reciprocatory tool holder and coöperating parts constituting a portion of the mechanism of our invention; Fig. 3 is an end view of the lathe on a smaller scale, taken from the left hand end of Fig. 1; Fig. 4 is a vertical section through a portion of the lathe, on the dotted line 4—4 of Fig. 1; Fig. 5 is a vertical section through the lathe mechanism, taken on the dotted line 5—5 of Fig. 1; Fig. 6 is a sectional view through the tool holder, taken on the dotted line 6—6 of Fig. 1; the work or piece of metal to have an irregular hole formed therein being represented by dotted lines, and the transversely movable cutting tool carried by said holder being shown in its outer position; Fig. 7 is a detached view of the cam-mechanism by which the transverse movements of the tool are, through intermediate parts between said mechanism and tool, effected; Fig. 8 is a vertical transverse section, partly broken away, through the arm which in the assembled mechanism engages the cam mechanism, shown in Fig. 7; Fig. 9 is a vertical longitudinal section, partly broken away, through the tool holder and coöperating parts taken on the dotted line 9—9 of Fig. 6, and Fig. 10 is an enlarged detached perspective view of the cutting tool.

In the drawings, 15 designates the bed of a lathe, 16 a head-frame thereon, 17 a tail-frame on said bed and 18 a usual driving-pulley whose motion is, through a pinion 19, imparted to the main gear wheel 20 secured on the live spindle 21. In the present instance we secure on the spindle 21 a holder or chuck 22 for the work or piece of metal 23 in which the polygonal hole is to be formed. The holder 22 may be of any suitable construction adapted to hold the work 23 and compel the same to rotate with the spindle 21. At present the holder 22 comprises a main body carrying clamps 24, coöperating screws 25 and spacing blocks 26 against which the work is bound by said clamps and screws. The work 23 is shown as a circular piece of metal having a circular or round hole 27 therein, which hole is to be given a polygonal outline by the means constituting our invention. In the illustration of our invention presented herein, the hole 27 will be given the square outline indicated by dotted lines in Fig. 6.

The tail-frame 17 is mounted in guides 28 and may be moved or adjusted toward and from the work 23 by means of a manually operative screw 29, which is rotatably connected at one end with said frame and at its outer threaded portion engages an internally threaded opening or nut in a stationary standard 30. On the outer end of the screw 29 is a hand-wheel 31.

The frame 17 has secured to the forward side of its upper portion the cylindrical tool-holder 32, whose rear end is screwed into said frame 17 and whose front end is closed by a hardened metal cap 33 having at its upper edge a narrow rearwardly extending part 34 filling a slot formed to receive it in the top of the holder 32. The cap 33 and its extension 34 may be secured to the holder 32 by means of screws, as shown in Figs. 2, 4 and 9. In the extension 34 of the cap 33 is formed a vertical opening 35 for the transversely disposed cutting-tool 36. The tool 36 snugly fills the opening 35 and has a sharpened outer edge, and said tool has formed in the side of its inner portion an inclined recess 37 which fits freely upon an upwardly and forwardly inclined rib 38 which is integral with a reciprocatory or sliding rod 39 housed at its forward portion within the cylindrical tool holder 32 and at its rear portion being extended through and guided by the frame 17, as shown in Fig. 1. The rod 39 is slidable within the cylindrical tool-holder 32 and at its forward portion is recessed, as at 40, to afford a space for the tool 36 and provide for the sliding movement of the rod with relation to said tool. When the rod 39 is moved rearwardly, or toward the right looking at Figs. 1 and 2, it will, through the rib 38 and walls of the recess 37, cause the tool 36 to be projected laterally for operative action, and when said rod 39 is moved forwardly, or toward the left, looking at Figs. 1 and 2, it will, through the rib 38, effect the inward movement of the tool 36. The rod 39 in its movements controls the action and position of the tool 36, and since said tool cuts the angles of the hole in the work 23, the movements of said rod must be of predetermined timing with relation to the rotary movement of the work.

The mechanism provided by us for securing the proper sliding movement of the rod 39 and the consequent projection and withdrawal of the tool 36, comprises a rotary cam mechanism mounted in the lower portion of the frame 17 and consisting of a hollow hub 41 and corresponding cams 42, 43 integral therewith, an operating shaft 44 extending through and secured to said hub, a pinion wheel 45 in mesh with the gear wheel 20 and to which said shaft 44 is slidably keyed, and an arm 46 secured at its upper end to said rod 39 and at its lower end being between the cams 42, 43 and carrying hardened rollers 47 in engagement therewith. The frame 17 is provided with a rod 48 passing through the arm 46 and serving to guide and maintain the lower end of the same in due relation to the cams 42, 43. The shaft 44 is slidable through the pinion 45 as the frame 17 is moved by the screw 29; and the lower end of the arm 46 is split (Fig. 8) and receives a screw 49 which may be used to fix the initial relation of the rollers 47 to the cams 42, 43 and thereafter to spread said rollers outwardly in a direction from each other to compensate for any wear on said cams.

The cams 42, 43 are alike and might be considered as one wheel with a peripheral cam-groove in it. The cam 42 has a uniform face except at 50, where a conical projection is formed thereon. That side of the cam 43 which faces the cam 42 has a uniform face except at 51, where it has a conical recess directly in line and corresponding with the projection 50 on the cam 42. During their rotation the cams 42, 43 engage the lower end of the arm 46 and by reason of the projection 50 and recess 51 in said cams, cause said arm and the rod 39 connected with it to have a definite reciprocating movement toward and from the work 23, with the result of effecting the gradual alternate projection and withdrawal of the tool 36, said tool being projected as one side of the projection 50 and recess 51 approach and ride against the lower end of the arm 46 and caused to recede as the other side of said projection and recess travel in a direction from the lower end of said arm 46.

In the illustration of our invention presented herein, a square hole is to be formed in the work and the tool 36 is to be projected and withdrawn four times during each rotation of the work 23, so that said tool may cut the four angles in the walls of the hole, and hence, there being only one projection 50 on the cam 42, the pinion wheel 45, shaft 44 and cams 42, 43 will be given four rotations to each rotation of the work 23. The pinion wheel 45 has four rotations imparted to it during each rotation of the driving gear wheel 20, said gearing being "four to one", and hence it will be apparent that the cams 42, 43 will have four rotations to each rotation of the work. When the work 23 is to have a hole possessing five, six, seven or more angular walls formed therein, the timing of the cams 42, 43 with the work 23 will vary accordingly, said cams having five rotations to one rotation of the work when a five-sided hole is to be formed, six rotations to one rotation of the work when a six-sided hole is to be formed and seven rotations to one rotation of the work when a seven-sided hole is to be formed, and so on, there being one rotation of the cams for each angle to be formed in the hole. The timing of the cams with relation to the work may be readily accomplished at the gear wheel 20 and pinion 45, the gearing to be employed being five to one when a five sided hole is to be formed, six to one when a six-sided hole is to be formed, seven to one when a seven-sided hole is to be formed, and so on.

The operation of the machine will largely be understood from the description hereinbefore presented. In the use of the machine the work 23 having a round hole therein is clamped in the holder or chuck 22 and the frame 17 is advanced by means of the screw 29 until the tool-holder 32 is within the hole in the work up to the point that the cutter 36 is partly or wholly within the vertical plane of the outer or entering end of said hole, and thereupon the lathe or machine may be set in motion. During the operation of the machine the cutter 36 will be alternately projected and withdrawn, as hereinbefore described, and cut out the walls of the round hole in the work on angular lines and transform said hole into a hole of polygonal outline, as represented by the dotted lines in Fig. 6, said cutter during the operation being gradually advanced by the attendant through the medium of the screw 29 and frame 17, so that the cutter may gradually cut its way through the metal or piece of material under treatment.

In Fig. 6 a square hole has been represented by dotted lines as having been cut in the work, and it may be mentioned that said hole may be transformed into a hole having the shape of an eight-pointed star by simply giving the piece 23 a one-quarter turn in the chuck or holder 22 and again subjecting the same to the action of the cutter, which will then cut equal angles in the central portions of the sides of the square hole leaving the hole with eight projecting angles; a hole of the kind just described is useful in wrenches, for illustration, since it would fit over a nut in either of two main positions of the wrench handle.

What we claim as our invention and desire to secure by Letters-Patent, is:—

1. Mechanism for transforming a round hole in a piece of work into a polygonal hole of predetermined shape, comprising a holding-member for the work, a tool-holder member adapted to enter said round hole, a cutting-tool carried by said tool-holder member, means for projecting said tool laterally from and withdrawing it into said tool-holder member at intervals for cutting the angles in the hole, and means for rotating one of said members.

2. Mechanism for transforming a round hole in a piece of work into a polygonal hole of predetermined shape, comprising a holding-member for the work, a tool-holder member adapted to enter said round hole, a cutting-tool carried by said tool-holder member, means for projecting said tool laterally from and withdrawing it into said tool-holder member at intervals for cutting the angles in the hole, and means for rotating one of said members, combined with means for effecting a gradual advance relatively between the work and cutting-tool.

3. Mechanism for transforming a round hole in a piece of work into a polygonal hole of predetermined outline, comprising a holding-member for the work, a tool-holder member, a cutting-tool carried by said tool-holder member, means for projecting said tool laterally against the wall of the hole and withdrawing it therefrom at intervals for cutting the angles in the hole, and means for rotating one of said members.

4. Mechanism for transforming a round hole in a piece of work into a polygonal hole of predetermined outline, comprising a holding-member for the work, a tool-holder member, a cutting-tool carried by said tool-holder member, means for projecting said tool laterally against the wall of the hole and withdrawing it therefrom at intervals for cutting the angles in the hole, and means for rotating one of said members, said means for projecting and withdrawing said tool comprising a gear wheel timed to rotate correspondingly with said rotating member, and an actuating pinion wheel connected to be driven by said gear wheel and of such predetermined ratio with respect thereto that while said rotating member is making one rotation said pinion wheel will make as many rotations as there are angles to be cut in the wall of said hole, combined with means for effecting a gradual advance relatively between the work and cutting tool.

5. Mechanism for transforming a round hole in a piece of work into a polygonal hole of predetermined outline, comprising a holding-member for the work, a tool-holder, a cutting-tool carried by said tool-holder, means for rotating the work, cam-mechanism for effecting during such rotation the gradual projection of said tool against the wall of the hole and a like withdrawal of the same therefrom for cutting angular sides in the hole, and means for causing said cam-mechanism to project and withdraw said tool as many times during each rotation of the work as there are angles to be cut in the walls of the hole, combined with means for effecting a gradual advance relatively between the work and cutting tool.

6. Mechanism for transforming a round hole in a piece of work into a polygonal hole of predetermined outline, comprising a rotary work-holding member, a slidable frame carrying a tool-holder, a cutting-tool carried by said tool-holder, a slide within said tool-holder for projecting said tool laterally from and withdrawing it into said tool-holder for cutting the angular sides in the walls of said hole, cam-mechanism for actuating said slide, means for rotating said cam-mechanism during each rotation of the work as many times as there are angles to be cut in said hole, and means for moving said slidable frame toward and from the work-holder.

7. Mechanism for transforming a round hole in a piece of work into a polygonal hole of predetermined outline, comprising a rotary work-holding member, a tool-holder, a cutting-tool carried by said tool-holder, a slide within said tool-holder for projecting said tool laterally from and withdrawing it into said tool-holder for cutting the angular sides in the walls of said hole, cam-mechanism for actuating said slide, and means for rotating said cam-mechanism during each rotation of the work as many times as there are angles to be cut in said hole.

Signed at New York, in the county and State of New York, this 2nd day of December, 1912.

FREDRIK BIRCHLAND.
GUSTAF BIRCH.

Witnesses:
ARTHUR MARION,
CHAS. C. GILL.